F. H. AUBEUF.
AUTOMOBILE HEADLIGHT BRACKET AND MECHANISM FOR TURNING SAME.
APPLICATION FILED MAR. 5, 1909.

938,456.

Patented Nov. 2, 1909.

2 SHEETS—SHEET 1.

Witnesses:
Chas. H. Hughes.
Wm. H. Neier Jr.

Inventor
Frank H. Aubeuf
By his Attorneys

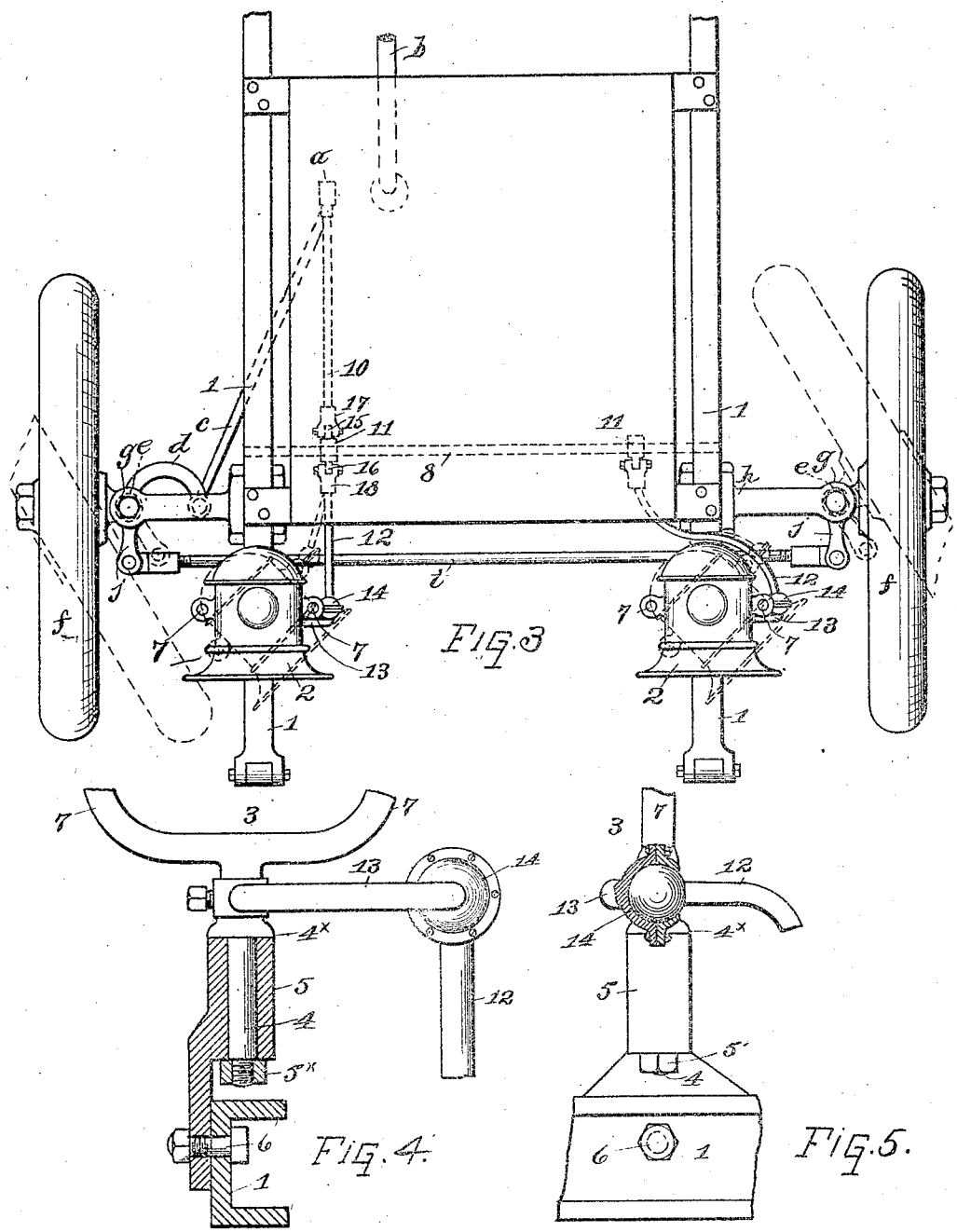

UNITED STATES PATENT OFFICE.

FRANK H. AUBEUF, OF ONEIDA, NEW YORK.

AUTOMOBILE-HEADLIGHT BRACKET AND MECHANISM FOR TURNING SAME.

938,456.  Specification of Letters Patent.  Patented Nov. 2, 1909.

Application filed March 5, 1909. Serial No. 481,231.

*To all whom it may concern:*

Be it known that I, FRANK H. AUBEUF, a citizen of the United States, and resident of Oneida, in the county of Madison, in the State of New York, have invented new and useful Improvements in Automobile-Headlight Brackets and Mechanism for Turning Same, of which the following, taken in connection with the accompanying drawings, is a full, clear, and exact description.

This invention pertains to automobiles and has for its object the provision of simple and reliable means for controlling the headlights so as to cause the light to be thrown to the right or left in accordance with the direction in which the vehicle is turned.

To that end the invention resides in the novel construction and arrangement of pivotal lamp-brackets and mechanism connecting said brackets to the steering-apparatus, whereby the brackets are turned in the operation of said steering-apparatus.

Figure 1:
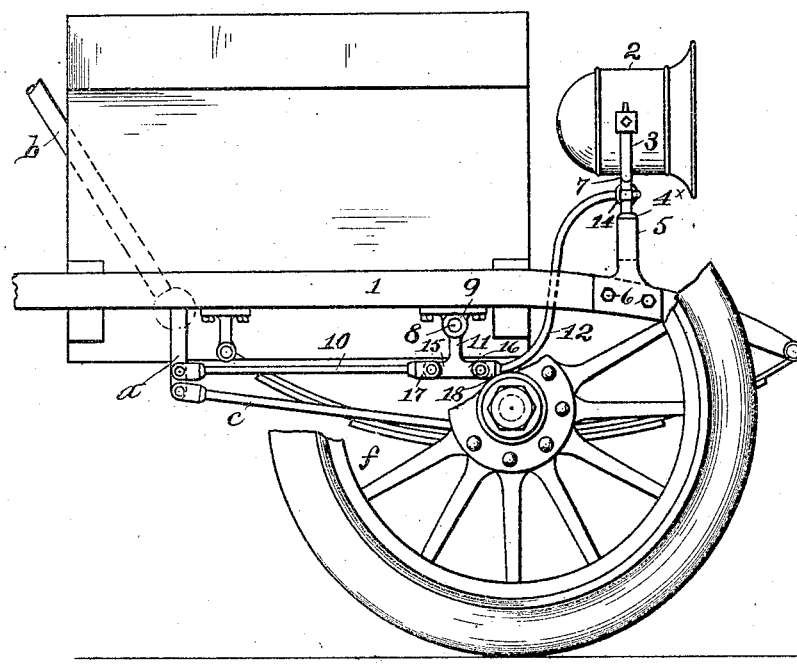
Figure 2:
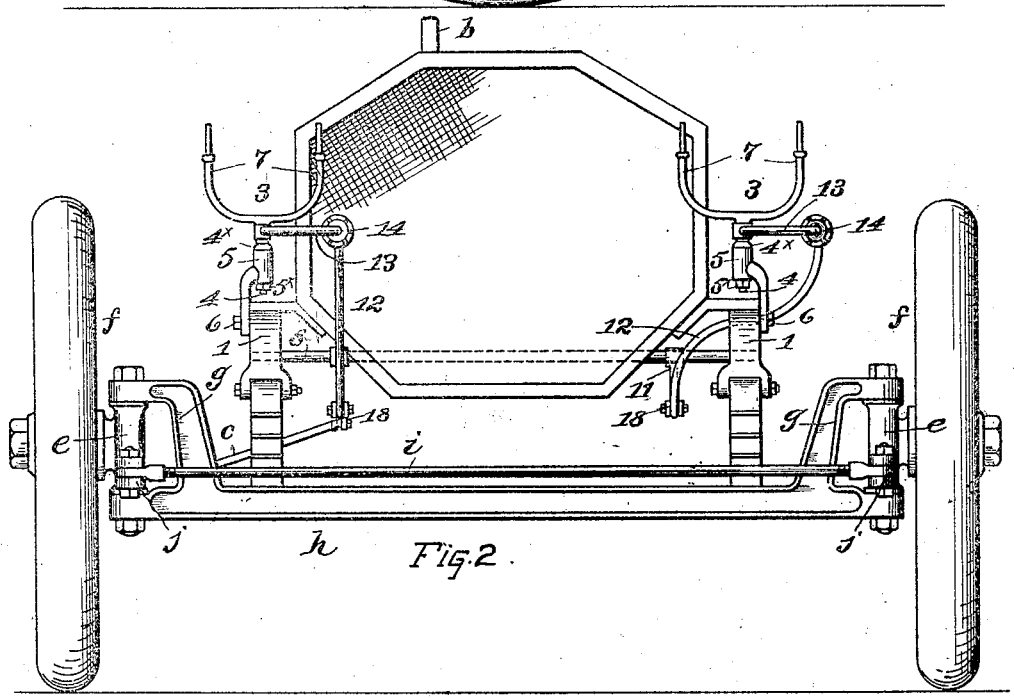

In the accompanying drawings Figure 1 is a side elevation of the front-end portion of an automobile equipped with my improvements; Fig. 2 is a front view of the automobile; Fig. 3 is a plan view of the front-end portion of the same; Fig. 4 is an enlarged detail vertical sectional view of the lamp-supporting bracket; and Fig. 5 is an enlarged detail view of the ball-and socket-joint employed in the connection of the bracket-arm and its actuating rod.

Referring to the drawings, —1—1— denote the usual longitudinal members of the running-gear frame of the automobile.

—2—2— denote the usual lamps disposed at the forward end of the automobile and which may be of any well known style. Said lamps are supported on brackets —3—3— as usual, which brackets are mounted on the frame-members —1—1— and each comprises a vertical stem —4— disposed rotatably in a sleeve —5— secured to a frame-member —1— by bolts —6—6— or other fastening devices, on the upper end of which stem is provided a pair of upwardly extending arms —7—7— between which the lamp is held in any suitable and well known manner. The stem —4— is preferably formed with a shoulder —4ˣ— bearing on the upper end of the sleeve —5—, and the stem protrudes at the lower end of the sleeve and is screw-threaded for the reception of a nut —5ˣ—.

As before stated, the present invention consists in the combination with the steering-apparatus, of pivotal head-light brackets, and means controlled by said steering-apparatus for turning the brackets.

The steering-apparatus may be of any of the well known forms used. The construction herein shown comprises a suitably supported depending rock-arm —a— disposed below the frame and operated by means of the usual rearwardly inclined post —b— through the medium of worm-gearing. To the lower or free end of said rock-arm is pivotally connected the rear end of a longitudinally extending rod —c—, the forward end of which rod is pivotally connected to a horizontally disposed arm —d— extending from and secured to or formed integral with one of the usual posts —e—e— which carry the spindles of the front wheels —f—f— in the well known manner. Said posts are sustained pivotally in bifurcations —g—g— formed at the ends of the axle —h—, the two posts being connected by means of the usual transverse shifting bar —i— pivotally connected at its ends to horizontal arms —j—j— secured to or formed integral with the respective posts —e—e—.

The mechanism for turning the aforesaid head-light brackets may be of any suitable construction and arrangement and may be actuated by either the rock-arm —a— or rod —c—, and in some instance the shifting bar —i— may be utilized for the purpose according to the construction and arrangement of the parts. I contemplate using the rock-arm for actuating the bracket-operating mechanism as shown. Said mechanism preferably comprises a transverse shaft —8— journaled in suitable bearings —9—9— secured to the undersides of the frame-members —1—1—, which shaft is arranged at a convenient distance in front of the rock-arm —a— and is designed to be oscillated thereby. To effect this oscillatory motion, I provide a longitudinally disposed rod —10— pivotally connected at its opposite ends to the free ends of the aforesaid rock-arm and a depending arm —11— secured to said shaft. The said shaft is provided with two arms —11—11— preferably disposed at the inner sides of the frame members, each of which arms has pivotally connected to it one end of a rod —12— which extends forwardly and upwardly therefrom and has its forward end connected to an arm —13— securely fastened to and extending horizontally from the stem —4— of one of the brackets. It is obvious that the arms —13—13— are required to be placed at corresponding sides of the brackets in order to cause the latter to be turned in the same direction.

To compensate for vibration of the frame caused by the action of the supporting springs, and thus guard against strain and resultant breakage at the junction of the rod —12— and arm —13—, I provide the parts with a universal connection consisting preferably of the well known ball- and socket-joint indicated at —14— and clearly illustrated in Fig. 5 of the drawings..

The arm —11— to which the rod —10— is connected is preferably formed at its free end with rearward and forward extensions —15—16— to which are pivoted suitable couplings —17—18— having screw-threaded connections with the respective rods —10— 12—. These screw-threaded connections afford adjustments to take up wear when found necessary.

It will be evident that when the steering-apparatus is actuated, the headlights will be turned to throw the light in accordance with the direction in which the vehicle is turned as indicated by dotted lines in Fig. 3.

What I claim as my invention is:—

1. In an automobile, the combination with the running-gear frame and steering-apparatus, of pivotally supported head-light brackets, mechanism for turning said brackets comprising a rock-shaft supported on the frame and operated by the steering-apparatus, arms fastened to the brackets, and rods transmitting motion from said shaft to the brackets as set forth.

2. In an automobile, the combination with the running-gear frame and the steering-apparatus comprising an oscillatory shaft, of head-light brackets consisting of vertically disposed sleeves mounted upon the frame and stems sustained rotatably in said sleeves, and provided with lamp-holding means, mechanism for turning said brackets comprising a forward shaft disposed in front of the aforesaid shaft and parallel therewith, and adapted to be oscillated thereby, arms secured to and depending from said forward shaft, horizontal arms fastened to the aforesaid bracket-stems, and rods connecting said horizontal arms and depending arms as and for the purpose set forth.

3. In an automobile, the combination with the steering-apparatus, of pivotally supported upright head-light brackets, and mechanism actuated by the steering-apparatus for turning said brackets, said mechanism comprising longitudinally shifting rods extending forwardly and upwardly from the steering-apparatus, arms extending from corresponding sides of the brackets, and ball-and-socket-connections between said rods and arms as and for the purpose set forth.

FRANK H. AUBEUF. [L. S.]

Witnesses:
T. F. HAND, Jr.,
R. J. BREWER.